No. 662,690. Patented Nov. 27, 1900.
H. GEPPERT.
PROCESS OF PRODUCING COLD.
(Application filed Nov. 9, 1899.)
(No Model.)
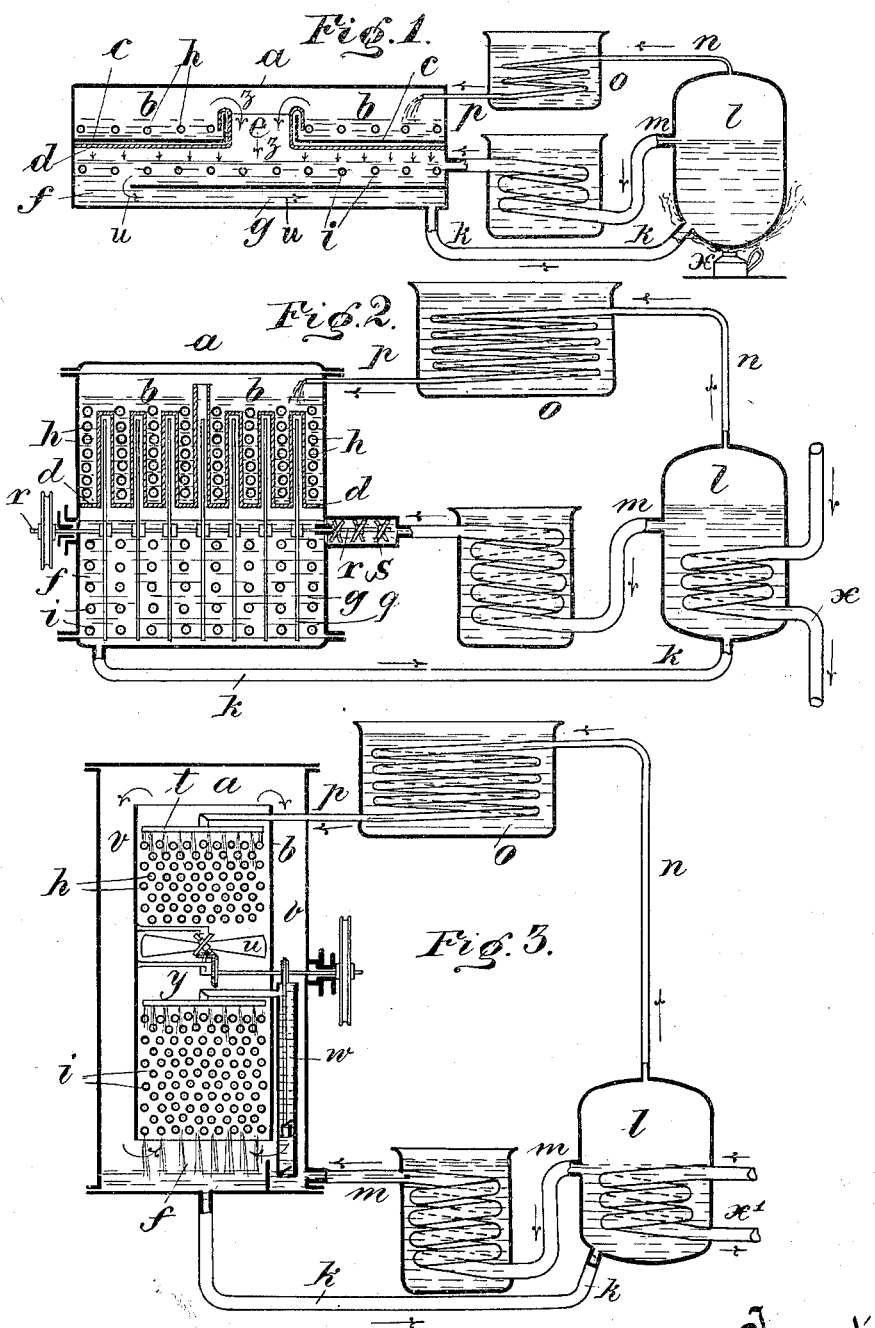

UNITED STATES PATENT OFFICE.

HERMANN GEPPERT, OF CARLSRUHE, GERMANY.

PROCESS OF PRODUCING COLD.

SPECIFICATION forming part of Letters Patent No. 662,690, dated November 27, 1900.

Application filed November 9, 1899. Serial No. 736,306. (No specimens.)

*To all whom it may concern:*

Be it known that I, HERMANN GEPPERT, engineer, residing at Kaiserstrasse 67, Carlsruhe, in the Grand Duchy of Baden, Germany, have invented new and useful Improvements in Processes of Producing Cold, (for which I have applied for Letters Patent in Germany, G. 13,404$^1$/17, dated May 8, 1899; in England, No. 13,875, dated July 5, 1899; in France, No. 279,776, dated August 14, 1899, and in Belgium, No. 11,040, dated August 14, 1899,) of which the following is a specification.

In the continuously-acting absorption refrigerating-machines hitherto known the process of producing cold is performed by evaporating a liquid, absorbing the vapors by a suitable absorption liquid, expelling the absorbed vapors from the liquid by boiling heat, condensing the vapor expelled in the boiler by cooling the same, and returning the condensed liquid from the condenser into the evaporating vessel. This process goes on in an apparatus containing nothing but the evaporating and absorption fluids and vapors. The condenser and the vaporizer in such an apparatus show different pressures corresponding to the different temperatures. The pressure in the boiler is approximately equal to that in the condenser, which is at one end in direct connection with the boiler, and the pressure in the absorber is approximately equal to that in the vaporizer, which is in direct connection with the absorber. In order to feed the absorption liquid into the boiler, a pressure-pump is used making up the difference between the pressures in the absorber and in the boiler, and in order to lead the condensed vapors to the evaporator and the absorption liquid from the boiler into the absorber reducing-valves are interposed between the condenser and the vaporizer and between the boiler and the absorber.

This invention is a modification of the above-mentioned process; and it consists in introducing some gas or vapor other than the vapors of the evaporating and absorption fluids, preferably air, into the evaporator and absorber and eventually into the condenser under a suitable pressure and raising by it the pressure in the evaporator and absorber and eventually in the condenser and equalizing approximately the pressure in the whole apparatus.

Hereby the raising and lowering of the pressures and the involved inconveniences in the continuous process might be dispensed with or materially diminished. At the same time the process is changed in so far as the evaporated gas does not move as an undivided body through the conduits; but there is a diffusion of these vapors through the admixed gas or vapor, which is itself neither condensed nor absorbed nor appreciably moved from the condenser into the vaporizer, or vice versa.

The admixing of air and raising of the pressure in the vaporizer does not prevent the evaporation, according to well-known principles of the physical science.

In a room filled with gas any liquid evaporates without having the boiling heat and pressure. The arising vapor mixes with the gas by diffusion, and this mixture contains on the surface of the liquid the greatest percentage of vapor. This percentage of vapor is gradually decreasing with the distance from the surface of the liquid and with the decrease of the temperature of the liquid.

Supposing several open vessels of different temperatures filled with a liquid—for instance, with water—and set up close to each other in a room filled with gas—for instance, in the atmosphere—the pressure of seven hundred and sixty millimeters mercury exists everywhere. The same is composed above the water of $+20°$ centigrade of seventeen millimeters partial vapor-pressure plus seven hundred and forty-three millimeters partial air-pressure, equaling seven hundred and sixty millimeters. Above water of $+90°$ centigrade the pressure is composed of five hundred and twenty-five millimeters partial vapor-pressure plus two hundred and thirty-five millimeters partial air-pressure, equaling seven hundred and sixty millimeters. Above water of $100°$ centigrade the pressure is composed of seven hundred and sixty millimeters partial vapor-pressure plus no millimeter partial air pressure, equaling seven hundred and sixty millimeters. The partial air-pressure is here equal to nothing and the partial vapor-pressure equal to seven hundred and sixty millimeters—that is to say, the water is boiling and displaces the air entirely. Should these vessels stand close to each other in a vacuum, on account of the great difference of the different vapor-pressures the water would distil over very rapidly from the warmer to the cooler vessels. This distillation takes place in a gas-filled room also, but much slower by diffusion. The quantity of vapor which is diffusing through a layer of gas in a given unit of time is proportional to the area of the surface of the evaporating liquid and in inverse proportion to the thickness of the layer.

The above-explained principle is the base of this invention, according to which a liquid is evaporated in an atmosphere containing another gas than that generated by the evaporation, and the generated vapors pass on by diffusion to an absorber.

It is apparent that the new process may be carried out in different apparatus. In the following I have shown three different modifications of such apparatuses.

Figure 1 is a diagrammatic section of an apparatus. Figs. 2 and 3 are corresponding sections of modifications of this apparatus.

Referring to Fig. 1, the vaporizer $a$ contains the evaporating liquid $b$, and its bottom $c$ is lined underneath with a porous substance $d$, which extends through the opening $e$ and is immersed in the evaporating liquid $b$. This porous substance fills itself up by sucking the liquid $b$, and thereby getting a greater evaporating-surface. At a short distance from $d$ is the surface of the absorption liquid $g$, which is contained in the absorber $f$. Salt water is running through the pipes $h$ in the vaporizer $a$ and cold water through the pipes $i$ in the usual way. The liquid $b$ is evaporating and diffusing in the direction of the arrows $z$ through the gas which fills the vaporizer $a$ and the absorber $f$, being absorbed by the absorption liquid $g$. This liquid runs through the absorber $f$ in the direction of the arrows $u$, and being filled with the vapors of the evaporating liquid $b$ runs through the pipe $k$ into the boiler $l$, where the vapors contained in the liquid are expelled by boiling. After that the absorption liquid runs through the pipe $m$, which is refrigerated by cold water in the vessel back into the absorber $f$. This circulation is produced by the fact that the liquid, which is heated and boiling in $l$ through the medium of the heater $x$, is specifically lighter than at $f$ and stands, therefore, higher in $l$ than it does in $f$ and runs continually through $m$ toward $f$. The vapors are discharged from the boiler $l$ through the pipe $n$ into the condenser $o$, where they are condensed by the cooling-water and run through the pipe $p$ into the vaporizer $a$, whereupon the circulation is resumed anew.

Supposing that the machine is to be run by ammonia, the working is as follows: The apparatus is being filled with ammonia and water and air at a pressure of, for instance, fifteen atmospheres. The vapor-pressure of the liquefied ammonia in the vaporizer $a$ amounts, at the temperature subsisting in the vaporizer, to, for instance, 2.5 atmospheres in the condenser $o$ in the average to eight atmospheres. The vapor-pressure in the absorber $f$ is a little under 2.5 atmospheres, and the boiling liquid in the boiler $b$ produces a vapor-pressure of fifteen atmospheres. According to the previous explanations the pressure is composed in the vaporizer of 2.5 atmospheres partial vapor-pressure plus 12.5 partial air-pressure, equaling fifteen atmospheres; in the condenser of eight atmospheres partial vapor-pressure plus seven atmospheres partial air-pressure, equaling fifteen atmospheres; in the boiler of fifteen atmospheres partial vapor-pressure plus no atmospheres partial air-pressure, equaling fifteen atmospheres. Consequently there is at every point in the apparatus a total pressure of fifteen atmospheres. If any air should have been introduced into the boiler $l$, the vapor in the boiler $l$ expels it on account of its boiling-pressure. The vapor itself is discharged through the pipe $n$ into the condenser $o$ and is condensed and brought to a partial pressure of eight atmospheres, which permits the diffusion only through admixed air in the pipe $p$ toward the vaporizer $a$. The pipe $p$ being, however, narrow and long, only a very moderate quantity of vapor will diffuse over uncondensed, which will only slightly diminish the caloric effect of the machine. The liquefied ammonia runs through $p$ toward $a$. The movements of the vapors in the vaporizer $a$ and absorber $f$ take place by molecular diffusion only and not by bodily mechanical dislocation. The evaporating and absorbing surfaces are so extensive and the distance of both so short that great quantities of vapor diffuse over and an energetic refrigeration is obtained. It is clearly shown by these explanations that in different places of the condenser, as well as in the vaporizer, different temperatures can exist which can favorably be utilized for the caloric useful effect of the machine by running the salt water through the pipes $h$ and the cooling-water through the condenser by counter-current. The liquids of the apparatus can easily perform the circulation mentioned on account of the same pressure approximately existing all through the apparatus. The throttle-valves, forcing-pump, injector, and the like between the condenser and the vaporizer, as well as between the absorber and the boiler as used in the ordinary absorption-machines, are eventually omitted.

Referring to Fig. 2, $a$ is the vaporizer, (refrigerator,) whose bottom $d$ is composed of porous plates laid in a zigzag manner. In the spaces between those zigzags are set round disks $q$, which are mounted upon a revolving shaft $r$ and whose lower parts dip into the absorption liquid $g$. From this porous bottom $d$, which is impregnated with the evaporating liquid $b$, diffuse the vapors toward the disks $q$, which are moistened by the absorption liquid $g$ and which are continually presenting new surfaces on account of their revolution. The circulation of the absorption liquid $g$ from $f$ through $k$ toward $l$ and from $l$ through $m$ back again to $f$ is accelerated by the winged screw $s$ on the shaft $r$. The other parts of the machine are the same as in Fig. 1 and are designated by the same reference-letters.

Referring to Fig. 3, the vaporizer (refrigerator) $a$ consists of the pipes $h$, which are covered with a suitable porous material and through which salt water is circulated. The evaporating liquid which is coming from the condenser $o$ is being distributed over the pipes $h$ by the rose $t$. The fan $u$ is blowing the gas which the apparatus contains through the spaces in between the pipes $h$, whereby the evaporating liquid evaporates, cooling the pipes $h$. As indicated by the arrows, the mixture of gases passes through the channels $v$ into the absorber $f$, where the vapors are absorbed, whereas the air is returned directly between the pipes $h$. Absorber $f$ consists of the pipes $i$, which are covered with the porous material and in which circulates the cooling-water. A small pump $w$ supplies the rose $y$, which sprinkles the pipes $i$ of the absorber with absorption liquid $g$. The mode of operation of the machine and the reference-letters are the same as shown in Fig. 1.

The pipes marked $x$ in Figs. 2 and 3 are heating-coils to heat the boiler $l$ and perform the same function as the heater $x$ in Fig. 1.

It is understood that in carrying out the described process all supplementary devices used in machines of the described nature are to be applied in their proper place, though not shown in this specification.

In the aforesaid example the total pressure was given at about fifteen atmospheres; but this pressure can be varied between wide limits, yet it is not desirable to go under eight atmospheres.

The pressure in the boiler may be somewhat higher than in the evaporator in order to keep up the circulation and overcome the friction in the conduits.

Whereas it is desirable to raise the pressure in the vaporizer enough to entirely dispense with throttle-valves and pressure-pumps and the like, it is apparent that a great advantage may be obtained though by raising the pressure under that limit, less power is required for the pump, and less wear and tear of the pump and valves and a better function of the same secured.

All the well-known liquids—as ammonia, chlorid of methylene, methylether, chlorid of ethylene, sulfuric ether, carbonic disulfid, first essence of petroleum, &c.—can be utilized in the new process as evaporating liquids and water; different alcohols, hydrocarburets, and the like as absorption liquids. The additional gas-pressure to be given in the apparatus can be varied within wide limits and depends upon the vapor-pressure of the evaporating liquid and is in general the greater the more volatile this liquid is—that is to say, the greater the vapor-pressure of this liquid is.

The construction of the machine is most favorable for the utilization of evaporating liquids whose boiling-points at the atmospheric pressure equal seven hundred and sixty millimeters mercury are between $+10°$ and $+50°$ centigrade, as the total pressure in the apparatus can be raised thereby to about one atmosphere, equaling seven hundred and sixty millimeters mercury. Hereby a great advantage in the construction of the apparatus is obtained in so far that the inner pressure never sinks below the atmospheric pressure, and consequently the vessels need not be constructed to sustain external pressure. This raising of the pressure is equally advantageous with regard to pumps, as no air-pump need be applied.

Now what I claim, and desire to secure by Letters Patent, is the following:

1. The herein-described process of refrigeration, consisting in evaporating a volatile liquid, effecting the absorption of the vapor thus produced by an absorption liquid, effecting the disengagement of the vapor from the absorption liquid by heat, condensing the vapor and effecting a movement of circulation of the vapor by diffusion through a gaseous body other than the vapor of the volatile liquid referred to.

2. In a continuous process of refrigeration, the subprocess which consists in evaporating liquid in a circulating system which contains a gaseous fluid other than the vapor produced by evaporating the liquid, producing a movement of circulation of the vapor resulting from the evaporation by diffusion through the said fluid and maintaining the total pressure uniform in the circulating system.

3. In the process of refrigeration, the subprocess which consists in expelling a vapor by heat, thereby producing a vapor-pressure, condensing the vapor in the presence of a gaseous body other than the vapor thereby producing at the place of condensation a total effective pressure greater than the mere vapor-pressure at that point, and effecting the flow of the condensed product, the evaporation thereof, the mechanical diffusion of the resulting vapor through the gaseous body and the absorption of said vapor into a liquid.

4. The herein-described continuous process of refrigeration consisting in continuously carrying out the following steps: evaporating a volatile liquid, absorbing the produced vapor by an absorption liquid, disengaging the vapor from the absorption liquid by heat and recondensing the same, the evaporation and absorption being performed in the presence of a gas or gases other than the vapor hereinbefore referred to, whereby the circulation of vapor will be effected by molecular diffusion through the said lastmentioned gas or gases and whereby the total effective pressure will be the same, or substantially so, in the various parts of the circulating system.

5. The herein-described continuous process of refrigeration which consists in evaporating a volatile liquid in an atmosphere containing a non-evaporating and non-absorbing gas, the evaporated gas passing by diffusion from the surface of the evaporator through a thin layer of said atmosphere to the opposite surface of the absorbing liquid.

6. The herein-described continuous process of refrigeration, which consists in evaporating a liquid, absorbing the produced vapor by an absorption liquid, expelling the vapor from the absorption liquid by heat, condensing the expelled vapor by refrigeration and returning the products of condensation for evaporation, the fluid circulation taking place in the presence of a gas other than that to be condensed, whereby substantially the same pressure will be maintained throughout the circulating system and a continuous flow of the fluid will take place.

In testimony whereof I have signed my name to this specification in the presence of two subscribing witnesses.

HERMANN GEPPERT.

Witnesses:
EMIL FEISSKOHL,
HEINR. HOLLSTEIN.